United States Patent [19]

Adler

[11] Patent Number: 5,222,000
[45] Date of Patent: Jun. 22, 1993

[54] FLEXIBLE MIRROR

[76] Inventor: Ronald E. Adler, 285 Woodland Dr., NW., Washington, D.C. 20008

[21] Appl. No.: 716,969

[22] Filed: Jun. 18, 1991

[51] Int. Cl.⁵ .......................... G02B 5/08; G02B 7/18
[52] U.S. Cl. ..................................... 359/847; 359/883
[58] Field of Search ............... 359/846, 847, 848, 871, 359/883; 272/13, 8 M

[56] References Cited

U.S. PATENT DOCUMENTS

| | | | |
|---|---|---|---|
| 840,084 | 1/1907 | Muller | 359/846 |
| 884,217 | 7/1907 | Schuessler | 359/872 |
| 2,129,513 | 9/1938 | Wegener | 359/846 |
| 4,128,310 | 12/1978 | Miller | 359/847 |
| 4,280,753 | 7/1981 | Neubauer | 359/847 |
| 4,343,533 | 8/1982 | Currin et al. | 359/883 |
| 4,491,389 | 1/1985 | Coburn, Jr. | 359/848 |
| 4,511,215 | 4/1985 | Butler | 359/847 |
| 4,643,544 | 2/1987 | Loughran | 359/866 |

Primary Examiner—Bruce Y. Arnold
Assistant Examiner—R. D. Shafer
Attorney, Agent, or Firm—Wigman, Cohen, Leitner & Myers

[57] ABSTRACT

A flexible mirror assembly that may be bent into various complex configurations by the user, thus creating numerous distorted images for amusement purposes. The mirror assembly has a laminated construction comprising a first reflective layer formed of a metallic film coated on a carrier material, a second intermediate layer formed of a thin plastic sheet for stiffening the first layer, and a third backing layer formed of a foam material for providing structural support to the assembly while being sufficiently flexible to permit bending thereof about plural axes. The mirror assembly may be mounted in a flexible frame.

9 Claims, 2 Drawing Sheets

FLEXIBLE MIRROR

BACKGROUND OF THE INVENTION

1. Field of the Invention

This invention relates generally to amusement devices, and more particularly to a flexible mirror that may be bent into various complex configurations by the user, thus creating numerous distorted images.

2. Description of the Prior Art

The mirror of this invention is of the general type usually found in amusement parks wherein a large mirror having one or more concave and/or convex undulations is arranged to reflect a highly distorted image of a person. The person may be made to appear grotesquely short or tall, fat or thin, or some combination thereof. The image may be made to vary by moving toward or away from the mirror, thus changing the focal point. The typical amusement park mirror, however, has a rigid construction which reflects the same type of image in all cases, depending upon the position of the object (person) reflected therein. Consequently, many amusement parks have two or more such mirrors arranged side-by-side, each having a different configuration so as to reflect a differently-distorted image.

It is also known in the art to provide amusement devices of the aforementioned type in which the mirror is constructed of a flexible material and is arranged to be bent into a plurality of different configurations, thus permitting the distorted image to be varied as desired by the user. Such devices are exemplified by U.S. Pat. No. 3,451,157 to Zitter and U.S. Pat. No. 4,280,753 to Neubauer. The flexible mirrors of these prior art devices, however, are mounted in rigid frames which limit the manner and degree to which such mirrors may be bent.

SUMMARY OF THE INVENTION

It is a primary object of this invention to provide an amusement device comprising a flexible mirror that may be bent into an infinite number of configurations, thereby greatly enhancing the play value thereof.

Another object of this invention is to provide an amusement device comprising a flexible mirror that may be bent around a plurality of intersecting axes, thereby permitting highly distorted and unusual images to be reflected therefrom.

A further object of this invention is to provide a flexible mirror having a laminated construction which permits relatively severe bending without cracking or buckling of the mirror surface.

Yet another object of this invention is to provide a portable amusement device of relatively simple construction comprising a flexible mirror which may be bent into simple or complex shapes depending upon the skill and dexterity of the user.

Briefly described, these and other objects and advantages of the invention are obtained by providing a mirror constructed from a thin film chrome-plated Mylar ® plastic. The mirror is bonded to a thin sheet of flexible plastic material which, in turn, is embedded in a poly foam backing layer. A picture-type frame, preferably formed of a foam material such as polyurethane or other flexible material such as rubber, may be disposed around the periphery of the laminated mirror construction.

Play value of the device is achieved by bending the mirror while holding it in both hands. This creates highly distorted and multiple images of the user's face, some large and fat while other bends will create very narrow distortions of the face and neck. It is also possible to flex the mirror about more than one axis at the same time.

By relaxing the bends, the mirror automatically snaps back into a planar shape. Some highly complex shapes can be made, thus permitting the user to express his or her imagination in a new art form. Because of its inherent flexibility, the amusement device of this invention can be bent into simple and complex curves, depending upon the imagination and dexterity of the user. Such curves may include cylinders, parabolas, and spherical-like reflective surfaces.

This invention is intended to maximize play value of the amusement device while minimizing deterioration of its mirror surface. Play value depends in part on the amount of control or ease of manipulating the shape and extent of the desired bends.

The laminated mirror construction comprises a first reflective layer formed of a metallic film coated on a carrier material such as plastic, a second intermediate layer formed of a thin plastic sheet, and a third backing layer formed of a foam material, the backing layer providing structural support to the mirror assembly while being sufficiently flexible to permit bending thereof about plural axes. The intermediate layer of plastic material provides sufficient stiffness to prevent the thin film mirror sheet from becoming damaged from sharp bends and creasing. The foam backing material serves the function of smoothing or dampening the radius of the bend. This is especially important when bending is performed on intersecting axes, for example when creating a spherical shape. The same type of foam may be used for providing a frame around the mirror. Such a frame must be sufficiently flexible to minimize resistance to bending, since resistance at the perimeter of the mirror caused by a stiff frame may cause buckling of the mirror.

Preferably, fabrication of the laminated mirror assembly will utilize a latex-based contact cement for adhering the various layers to one another. This type of cement will retain its flexibility after hardening unlike other cements that turn brittle and crack upon being bent. An optional clear plastic cover may be used to help keep the mirror surface clean.

The nature of the invention will become more clearly understood by reference to the several views illustrated in the attached drawings, the following detailed description thereof, and the appended claimed subject matter.

DETAILED DESCRIPTION OF THE PREFERRED EMBODIMENT

Figure 1:
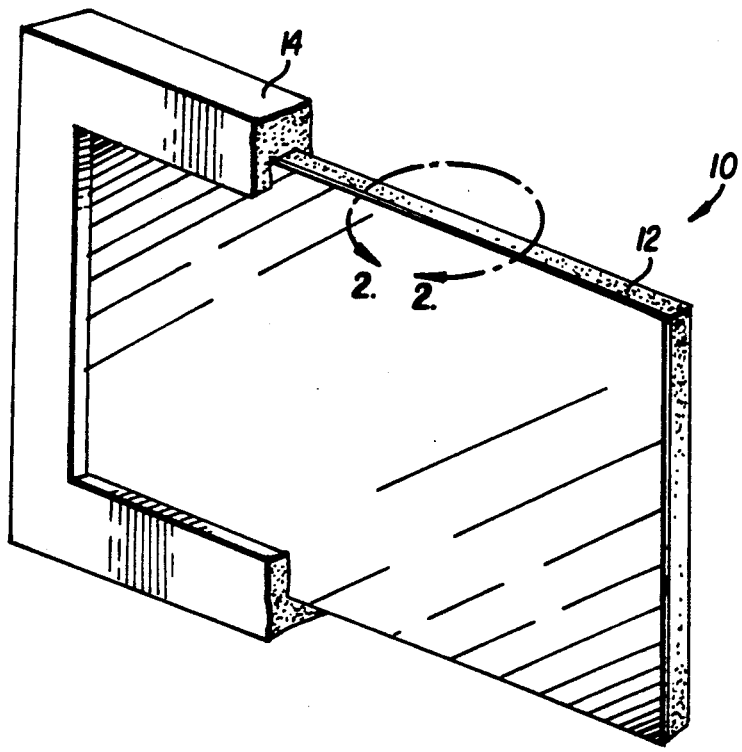
FIG. 1 is a fragmentary perspective view of the flexible mirror of this invention, showing a portion of the flexible frame cut away for clarity.

Referring now to the drawings in detail, there is illustrated in FIG. 1 an amusement device constructed in accordance with this invention generally designated by the numeral 10. The amusement device 10 includes a flexible mirror assembly 12 mounted in a flexible frame 14. The frame 14 may be constructed of a poly foam material such as polyurethane, or other flexible material such as rubber. Alternatively, the frame 14 may be omitted and a simple border provided around the periphery of the mirror assembly 12 by affixing paint or adhesive tape thereto.

Figure 2:
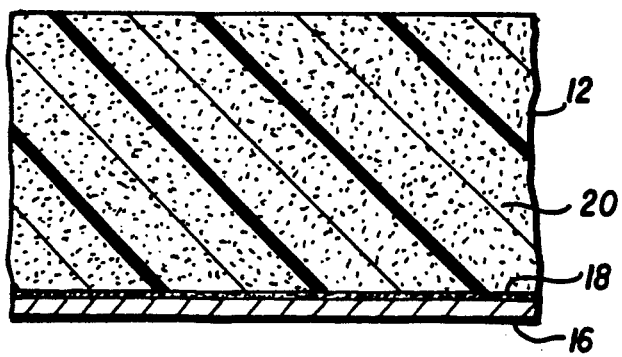
FIG. 2 is a fragmentary sectional view of the flexible mirror taken along line 2—2 of FIG. 1.

As seen most clearly in FIG. 2, the mirror assembly 12 is of a laminated construction including a first reflective layer 16, a second intermediate layer 18, and a third backing layer 20. The reflective layer 16 is constructed of a metallic film, such as chrome, coated on a plastic carrier material. Such a material is commercially available under the trademark Mylar ®. The intermediate layer 18 is preferably formed of a thin (0.016 inches) flexible plastic material. The intermediate layer 18 provides sufficient stiffness to prevent the reflective layer 16 from becoming damaged from sharp bends and creasing. The backing layer 20 is preferably formed from a poly foam material such as polyurethane. The layers 16, 18 and 20 may be bonded to one another by any suitable means, such as a latex-base contact cement.

Figure 3:
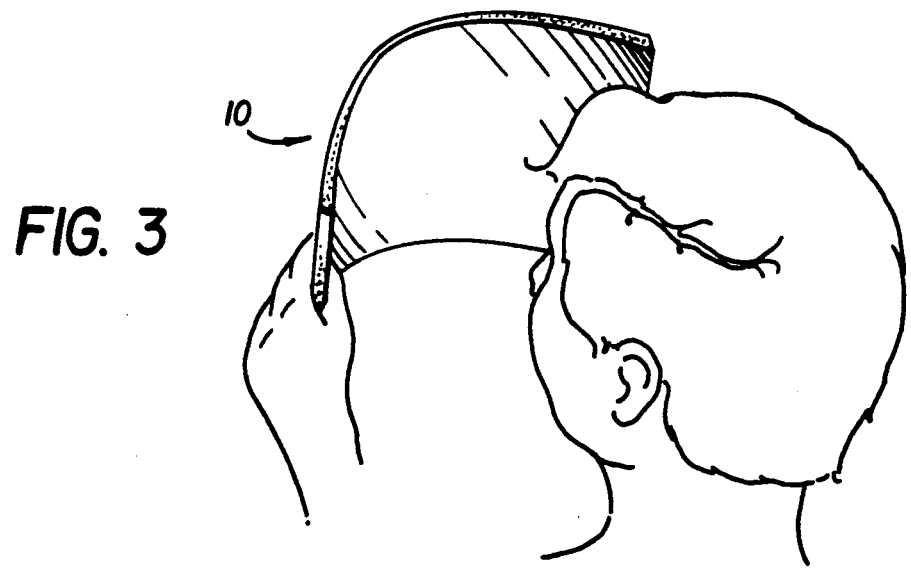
FIG. 3 is a perspective view showing a user bending the flexible mirror so as to provide a concave reflecting surface.
Figure 4:
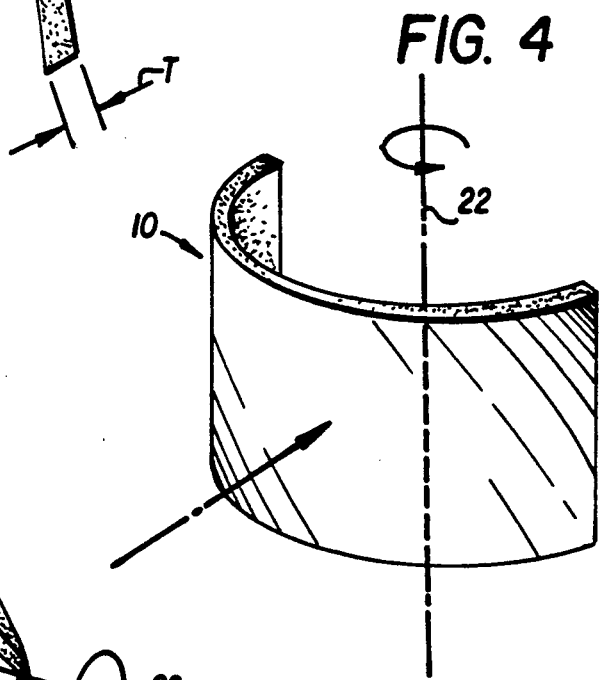
FIG. 4 is a perspective view of the flexible mirror bent about a vertical axis so as to provide a convex reflecting surface.
Figure 7:
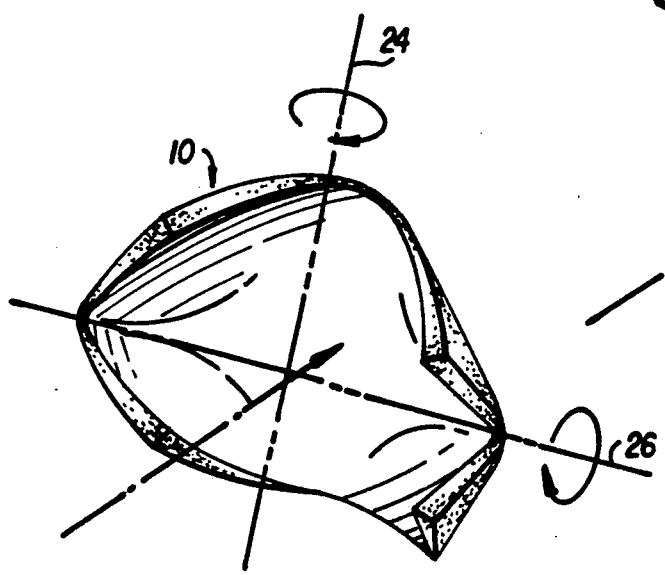
FIG. 7 is a perspective view of the flexible mirror being bent around intersecting axes.

As seen in FIG. 3, the amusement device 10 may be readily bent by a user into a concave shape so as to present a distorted image of the user. Alternatively, as seen in FIG. 4, the amusement device 10 may be bent about a vertical axis 22 so as to provide a convex reflecting surface. As seen in FIG. 7, the amusement device 10 can be bent simultaneously about plural intersecting axes 24, 26 so as to present a highly distorted and unusual image to the user. Because of its flexible construction, the amusement device 10 may be bent into any number of configurations having multiple undulations.

Figure 5:
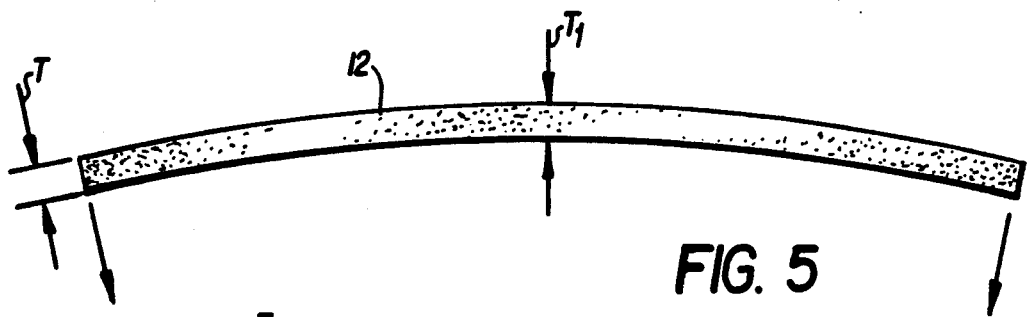
FIG. 5 is an end view of the flexible mirror having a slight bend formed therein.
Figure 6:
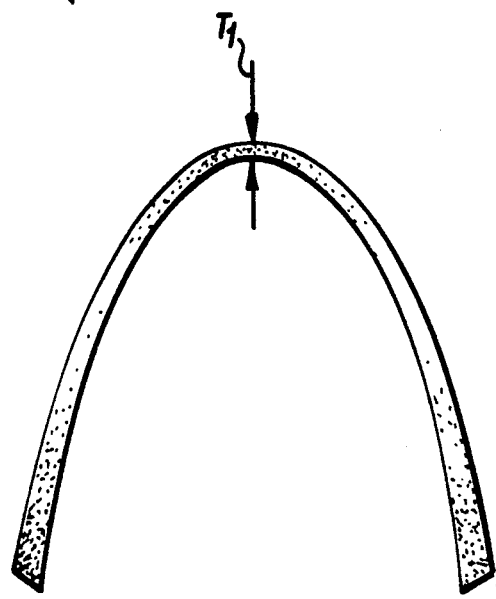
FIG. 6 is an end view of the flexible mirror having a severe bend formed therein.

As seen in FIG. 5, the mirror assembly 12 has a given thickness T. Because the foam backing layer 20 will become compressed when the mirror assembly 12 is bent, however, the thickness $T_1$ at the center of the bend will be somewhat thinner than the thickness T at the edge of the mirror assembly 12. When the mirror assembly 12 is only slightly bent as seen in FIG. 5, $T_1$ is only slightly less than T. However, as seen in FIG. 6, when the bend is severe, $T_1$ is substantially less than T. Because of the compressability of the foam backing layer 20, the mirror assembly 12 may undergo severe bends without cracking or creasing of the metallic reflective layer 16. It should be apparent that the outer convex surface of the foam backing layer 20 will be under tension and thus stretch as the mirror assembly 12 is bent, while the inner concave surface of the backing layer 20 will be compressed. Because of this construction, the tendency toward buckling of the foam backing layer 20 is diminished, thus promoting smooth bends in the reflective layer 16.

In view of the foregoing, it should be apparent that there is provided in accordance with this invention a novel amusement device that overcomes many of the problems and shortfalls in existing prior art devices of this type, and that provides substantial play value and enhances creativity in children of many ages.

While only preferred embodiments of the invention have been illustrated and described herein, it is to be understood that many modifications may be made therein without departing from the scope of the invention as set forth in the appended claims.

I claim:

1. An amusement device comprising a flexible mirror constructed of a chrome film plated on a thin carrier layer, a foam support backing layer, and a flexible frame, said mirror is constructed so as to be selectively bent around a plurality of axes to provide an infinite number of distorted images.

2. The amusement device of claim 1, said mirror is constructed so as to be bent around plural axes simultaneously.

3. The amusement device of claim 1, said mirror is constructed so as to be bent around intersecting axes.

4. The amusement device of claim 1, further including means disposed between said carrier layer and said backing layer for preventing said chrome film from becoming creased during bending.

5. The amusement device of claim 4, wherein said crease preventing means is a thin plastic layer.

6. The amusement device of claim 5, wherein said layers are adhesively bonded to one another.

7. The amusement device of claim 1, wherein said flexible frame is constructed of foam material.

8. The amusement device of claim 1, wherein said flexible mirror has a rectangular configuration.

9. The amusement device of claim 1, wherein said foam support layer is formed of polyurethane.

* * * * *